United States Patent
Brownell

(10) Patent No.: US 7,150,040 B2
(45) Date of Patent: * Dec. 12, 2006

(54) AUTHENTICATED FIREWALL TUNNELING FRAMEWORK

(75) Inventor: David Brownell, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 10/846,688

(22) Filed: May 17, 2004

(65) Prior Publication Data

US 2004/0215979 A1    Oct. 28, 2004

Related U.S. Application Data

(63) Continuation of application No. 09/203,719, filed on Dec. 1, 1998, now Pat. No. 6,754,831.

(51) Int. Cl.
*H04L 9/00* (2006.01)
*G06F 11/00* (2006.01)

(52) U.S. Cl. ............... 726/11; 726/2; 726/15; 713/153; 713/154; 709/223; 709/224

(58) Field of Classification Search .......... 726/2, 726/11, 15; 709/223, 224; 713/153, 154
See application file for complete search history.

(56) References Cited

U.S. PATENT DOCUMENTS

| | | | |
|---|---|---|---|
| 5,623,601 A | 4/1997 | Vu | |
| 5,699,513 A | 12/1997 | Feigen et al. | |
| 5,781,550 A | 7/1998 | Templin et al. | |
| 5,825,890 A | 10/1998 | Elgamal et al. | |
| 5,825,891 A | 10/1998 | Levesque et al. | |
| 5,826,014 A | 10/1998 | Coley et al. | |
| 5,828,846 A | 10/1998 | Kirby et al. | |
| 5,848,233 A | 12/1998 | Radia et al. | |
| 5,889,958 A | 3/1999 | Willens | |
| 5,944,823 A | 8/1999 | Jade et al. | |
| 6,047,377 A | 4/2000 | Gong | |
| 6,061,796 A | 5/2000 | Chen et al. | |
| 6,061,797 A | 5/2000 | Jade et al. | |
| 6,092,200 A | 7/2000 | Muniappa et al. | |
| 6,104,716 A | 8/2000 | Crichton et al. | |
| 6,119,234 A | 9/2000 | Aziz et al. | |
| 6,754,831 B1 * | 6/2004 | Brownell | 726/15 |

* cited by examiner

*Primary Examiner*—Taghi T. Arani
(74) *Attorney, Agent, or Firm*—Finnegan, Henderson, Farabow, Garrett & Dunner, L.L.P.

(57) ABSTRACT

A method and apparatus for managing network access to internal hosts protected by a firewall is provided. A user on an external host logs in into a firewall. Once the user has been authenticated to the firewall, a session is established for the user, and tunnel configuration is transmitted to the user's process on the external host. The tunnel configuration data indicates the configuration of at least one tunnel for connecting to at least one internal host protected by the firewall. When creating a socket for connecting to the internal host, the socket is configured based on the tunnel configuration data. Tunnel objects and tunnel socket objects may be specially configured to establish a connection in a way that takes advantage of the power and simplicity of the inheritance feature of object oriented software. Various tunnel classes are provided to configure tunnels in a variety of mariners.

12 Claims, 10 Drawing Sheets

TUNNEL CONFIGURATION TABLE 510

| | INTERNAL HOST 522 | INTERNAL PORT 524 | FIREWALL HOST 526 | TUNNEL ENTRY PORT 528 |
|---|---|---|---|---|
| 512 | H1. CORP | 143 | FW1 | 777 |
| 514 | H2. CORP | 143 | FW1 | 778 |
| 516 | H3. CORP | 143 | FW2 | 779 |
| 518 | *. CORP | 143 | FW3 | 780 |

FIG. 5A

INSIDE CHANNEL TABLE 550

| | FIREWALL HOST 562 | FIREWALL PORT 564 | INSIDE CHAN. 566 |
|---|---|---|---|
| 560 | FW1 | 777 | INSIDE CHAN 343 |
| | FW1 | 778 | INSIDE CHANNEL X |
| | FW2 | 779 | INSIDE CHANNEL Y |
| | FW3 | 780 | INSIDE CHANNEL Z |

FIG. 5B

AUTHENTICATED FIREWALL TUNNELING FRAMEWORK

This is a continuation of application Ser. No. 09/203,719, filed Dec. 1, 1998, which is incorporated herein by reference now U.S. Pat. No. 6,754,831.

FIELD OF THE INVENTION

The present invention relates to the security of networks and, in particular, to the security of hosts communicating through a firewall.

BACKGROUND OF THE INVENTION

The number of organizations linking their internal networks to the Internet is growing at what appears to be an exponential rate. Access to the Internet enables computers on the organization's internal network to access the computers on other networks linked to the Internet. Likewise, the computers on the other networks linked to the Internet may access the computers on the organization's internal network, thus rendering a organization's computer resources vulnerable to unwelcome and potentially malicious outsiders.

For the purpose of explanation, entities to which network traffic may be directed are referred to herein as "hosts". Examples of hosts include computers and printers.

One mechanism providing security against unwelcome outsiders is a firewall. A firewall is a combination of software and one or more network devices (e.g. routers) through which network traffic is directed. Firewalls are used to screen traffic between "internal" networks and "external" networks (e.g. networks linked to the Internet) for security purposes. Typically, a firewall protects resources on "internal" networks from undesired access via external networks by blocking or re-directing certain kinds of network traffic.

For example, referring to FIG. 1, corporate network 110 is protected by firewall 112 and thus corporate network 110 is internal relative to firewall 112. Host 182 is on an external network (not illustrated) that is linked to the Internet 228, and is external relative to firewall 112 and corporate network 110. Channel 192 represents a channel through which host 182 has attempted to connect to a web server on host 114, which is on corporate network 110. A web server is a server that communicates, for example, using the hypertext transfer protocol (HTTP). Firewall 112 prevents external host 182 from accessing the web server on host 114 by blocking the attempted connection. Channel 190, on the other hand, represents a connection by internal host 114 to a web server on external host 182 which is not blocked by firewall 112, thus permitting internal host 114 to access the web server on external host 182. Firewall 112 thus allows internal hosts to access web servers on external hosts, but does not allow an external host to access a web server on the internal network.

The terms "channel" and "connection" are used herein. A "channel" is a path of communication though which two or more processes may direct communication (as used herein, the term "process" refers to a process under the control of an operating system). For example, a process on internal host 114 may communicate to a process on external host 182 through a network link to firewall 112, and then through the Internet 228 to external host 182. This path of communication is referred to as channel, or more specifically, channel 192. A "connection" is a channel that two active processes are currently using to communicate. These processes need not communicate using HTTP. For example, a connection exists on channel 190 when a process on internal host 114 is using channel 190 to communicate with a process on host 182.

Channels may be constructed from one or more connections. For example, a "tunnel" is a kind of channel which is built from one connection from an external host to a firewall, and another from that firewall to an internal host. Data from one host to the other travels through both connections (and the firewall). The two hosts involved generally treat this channel just like they would treat a simple connection, except for the tunnel setup phase.

The typical steps to establish a connection between a first process and a second process include (1) the first process requesting the connection to the second process, and (2) receiving acknowledgement that the second process will accept and transmit data to the first process over the connection. A host is considered to be "connected to" another host when a process on the host is connected to a process on the other host. Under these conditions, the host is also considered to be "connected to" the process that is on the other host.

Referring again to FIG. 1, internal host 114 may be accessed by internal host 116 without going through the firewall. Internal hosts on a network are said to be "behind" the firewall because network traffic flowing between them does not pass through the firewall. External hosts are said to be "outside" the firewall because traffic between external hosts and internal hosts passes through the firewall.

Often, it is desirable to treat some external hosts as hosts that are "virtually" behind the firewall, thus providing those external hosts a higher level of access to the internal network than is provided to other external hosts. For example, an organization may operate a first network 110 at a first physical location (e.g., the organization's headquarters) and a second network 130 at a second physical location that is remote relative to the first location. The first network and second network are both external relative to each other and are both linked to the Internet 228. The services available on internal hosts 114, 116 on the first network include corporate electronic mail servers and corporate business applications. Because the second network 130 serves the same organization, it is desirable to provide hosts (e.g., host 134) on the second network 130 the same level of access that is provided the hosts 114, 116 on the first network 110. By giving hosts on the second network 130 the same level of access as hosts on the first network 110, electronic mail servers and corporate business applications may be accessed by hosts 134 on the second network 130, even though the hosts 134 on the second network 130 are external to the first network 110.

One mechanism of providing such access is referred to as a virtual private network. In a virtual private network, one or more secure channels interconnect two or more networks. Secure channels usually provide for the secure transmission of data by, for example, encrypting data that flows through the secure channel. Secure channels often pass through public networks such as the Internet.

FIG. 1 shows an example of a virtual private network. Corporate network 110 and corporate network 130 form a virtual private network and are interconnected by secure channel 138.

Network traffic between networks within a virtual private network passes through one of the secure channels without being blocked by the firewall. For example, traffic between host 134 and host 114 is not blocked by firewall 132 or firewall 112. Thus host 134 is treated as if host 134 is behind firewall 112.

It is possible that an unwelcome outsider may, by gaining access to one network within a virtual private network, compromise the security of every network within a virtual private network. For example, an unwelcome outsider may, by gaining access to host 134, gain access to corporate network 130 and corporate network 110.

To prevent a virtual private network from being compromised in this fashion, network traffic to and from hosts outside a virtual private network (i.e. a host connected to a network not part of the virtual private network) is often "consolidated" through one network. Specifically, all network traffic to and from members of a virtual private network is "funneled" through one network and its firewall. The network whose firewall is used to funnel the traffic between the members of the virtual private network is referred to as the "primary" network. The other networks within the virtual private network are referred to herein as "subsidiary" networks. A host on the subsidiary network is referred to as a subsidiary host.

For example, corporate network 110 is the primary network. Firewall 112 prevents network traffic between corporate network 110 and any network outside of the virtual private network. All network traffic between the hosts on corporate network 110 and corporate network 130 and hosts outside the virtual private network comprised of corporate network 110 and 130 is "funneled" through corporate network 110 and firewall 112.

One disadvantage of a virtual private network is that a virtual private network requires low-level changes to the operating system. Another disadvantage of most kinds of virtual private networks is the overhead incurred in funneling through the primary network all network traffic that travels between subsidiary hosts and hosts outside the virtual private network. Specifically, network traffic between a subsidiary host to a host outside the virtual private network must pass through the secure channel, through the firewall into the primary network, then back out the firewall of the primary network to the outside host. Furthermore, any network traffic through the secure channel is encrypted, even though such traffic may not need the level of security provided by encryption. The overhead involved in encrypting would not have occurred had the same network traffic been sent from the subsidiary host directly to the outside host.

For example, consider network traffic flowing from host 134 (FIG. 1) to host 182. Network traffic from host 134 to host 182 is encrypted and directed through secure channel 138 to corporate network 110. Network traffic then passes from corporate network 110 through firewall 112, and then through the Internet 228 to host 182. Note that encryption of the network traffic occurred for transmission over secure channel 138 even though encryption is not performed for the same network traffic as it passes from corporate network 110 to host 182.

Another disadvantage of most kinds of virtual private network is that all hosts on the virtual private network are provided the same level of network access as any other host on the virtual private network. Thus, such virtual private networks are unsuitable for common situations where it is desirable to "selectively" provide network access for external hosts to some internal hosts on a network but not to other internal hosts. For example, it may desirable for a business organization to allow the external hosts of customers to access an internal host providing "customer-ordering" services but prevent the external hosts from accessing the internal hosts on which the business organization's internal accounting services reside. If the networks of the customer are made part of a virtual private network that includes the network of the business organization, a host on the customer's network would have the same level of network access as an internal host on the business organization's network, and thus may be able to access the business organization's internal accounting services.

Yet another disadvantage of most kinds of virtual private networks is that users outside the primary network are granted similar access to the corporate network. Thus, such virtual private networks are unsuitable for common situations where it is desirable to "selectively" provide network access to various users on the same host, or to provide the same level of access to the same user on different external hosts. For example, an internal host ("clinical information server") in a hospital provides clinical information to clinical users. Patient confidentiality requires that access is generally denied to external hosts (i.e. hosts external to the hospital's network). Most virtual private networks do not concurrently prevent network access to the clinical server by one set of users, while permitting access to another set of users, e.g. doctors.

Based on the foregoing, it is desirable to provide a method which avoids the overhead caused by the consolidation of network traffic to and from networks outside a virtual private network through the primary network. It is further desirable to provide a method that selectively permits one type of network traffic from a set of hosts outside a firewall but blocks another type of network traffic from the same set of hosts.

SUMMARY OF THE INVENTION

A method and apparatus for managing network access to internal hosts protected by a firewall is described. According to an aspect of the present invention, a user on an external host logins into a firewall. Once the user has been authenticated to the firewall, a session is established for the user, and tunnel configuration data is transmitted to the user's process on the external host. The tunnel configuration data indicates the configuration of at least one tunnel for connecting to at least one internal host. When creating a socket for connecting to the internal host, the socket is configured based on the tunnel configuration data.

According to another aspect of the present invention, tunnel objects and tunnel socket objects may be specially configured to establish a connection in a way that takes advantage of the power and simplicity of the inheritance feature of object oriented software. Various tunnel classes are provided to configure tunnels in a variety of manners.

The present invention provides the ability to flexibly support a variety of "strategies" within the same basic application framework, and on the same host. The kind of IP packets that are sent do not have to be modified at the operating system level. Virtual private networks which focus on low level (IP) mechanisms do not have application information sufficient to provide comparable flexibility. The framework presented herein works from the low levels to the high levels in the network communications protocol stack.

According to another aspect of the present invention, the firewall may be managed at a finer level of granularity, because access may be based at least in part on the configuration data particular to the user, rather than solely based on configuration data particular to a host. For example, the same user can use different hosts at different times, and be granted the same level of access.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a block diagram showing an exemplary tunnel configuration table in accordance with an embodiment of the present invention;

FIG. 5B is a block diagram showing an exemplary inside channel table in accordance with an embodiment of the present invention;

DETAILED DESCRIPTION

A method and apparatus for providing firewall tunnels is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
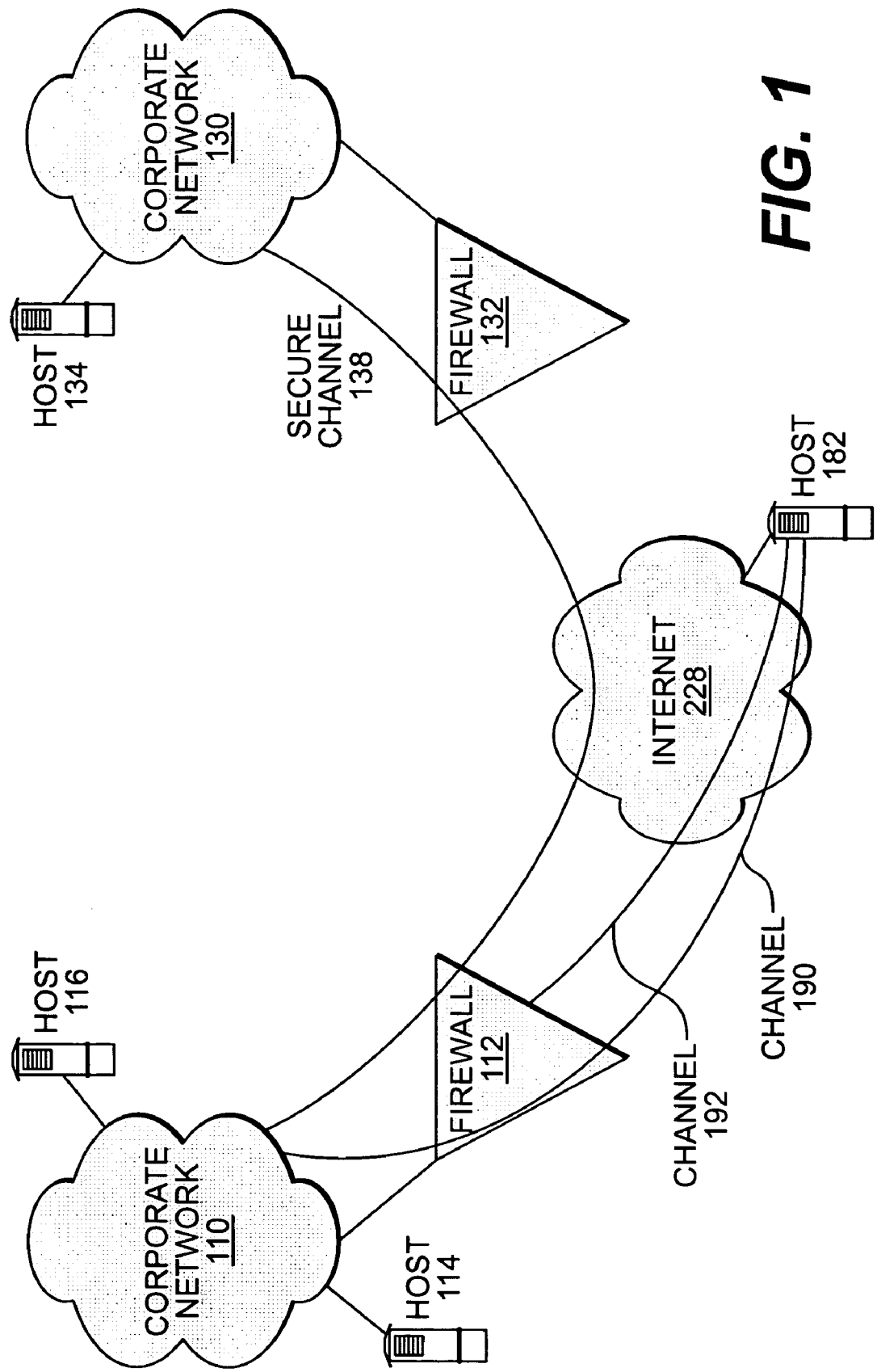
FIG. 1 is a block diagram showing a private virtual network.
Figure 2:
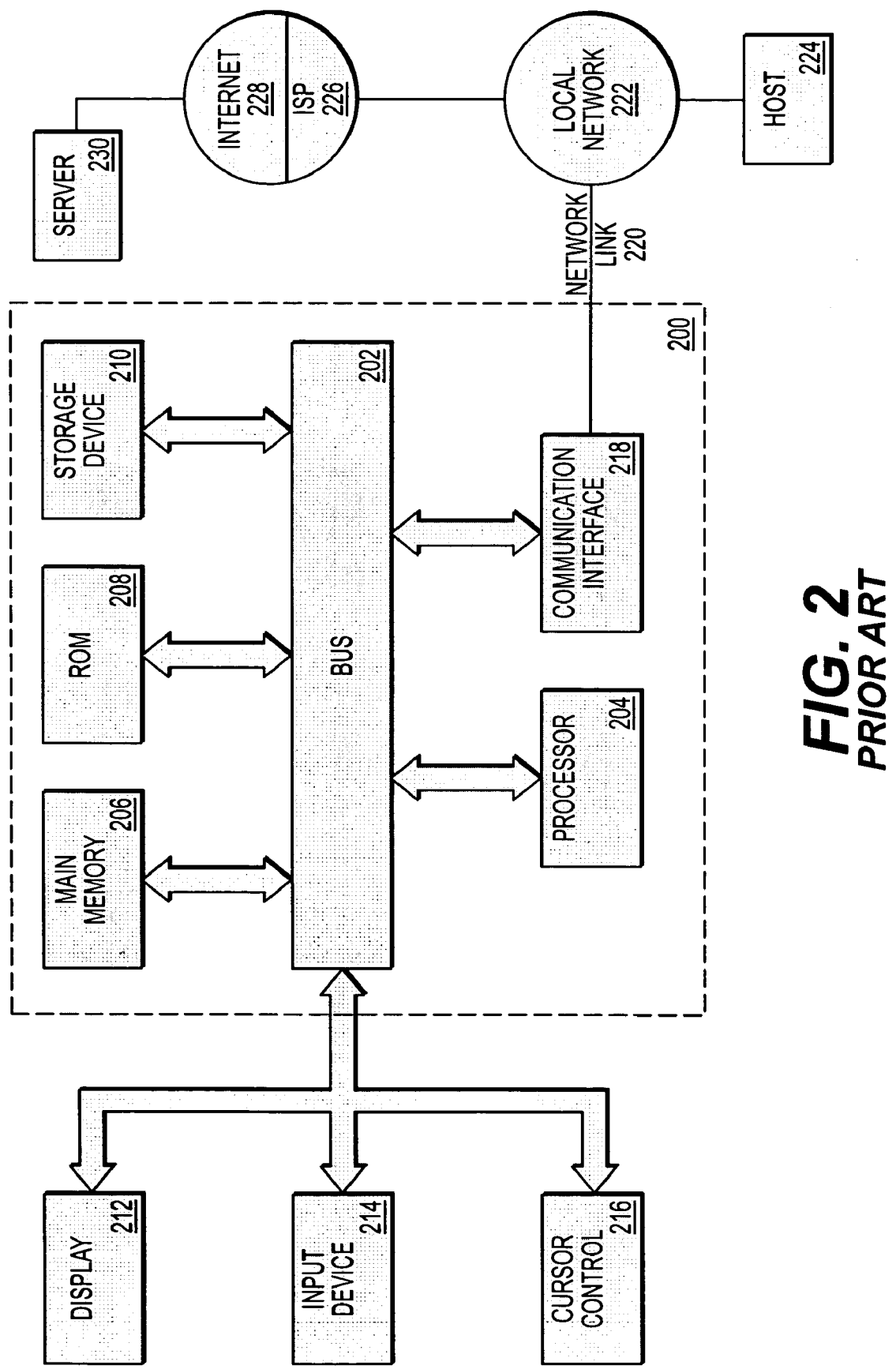
FIG. 2 is a block diagram that illustrates a computer system 200 upon which a firewall or networked host may be implemented according to an embodiment of the present invention.

FIG. 2 is a block diagram that illustrates a computer system 200 upon which a firewall or networked host may be implemented according to an embodiment of the present invention. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for providing firewall tunnels. According to one embodiment of the invention, firewall tunnels are provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for firewall tunnels as described herein.

The received code may be executed by processor 204 as it is received, and/or stored in storage device 210, or other non-volatile storage for later execution. In this manner, computer system 200 may obtain application code in the form of a carrier wave.

Exemplary Network Archectecture

Figure 3:
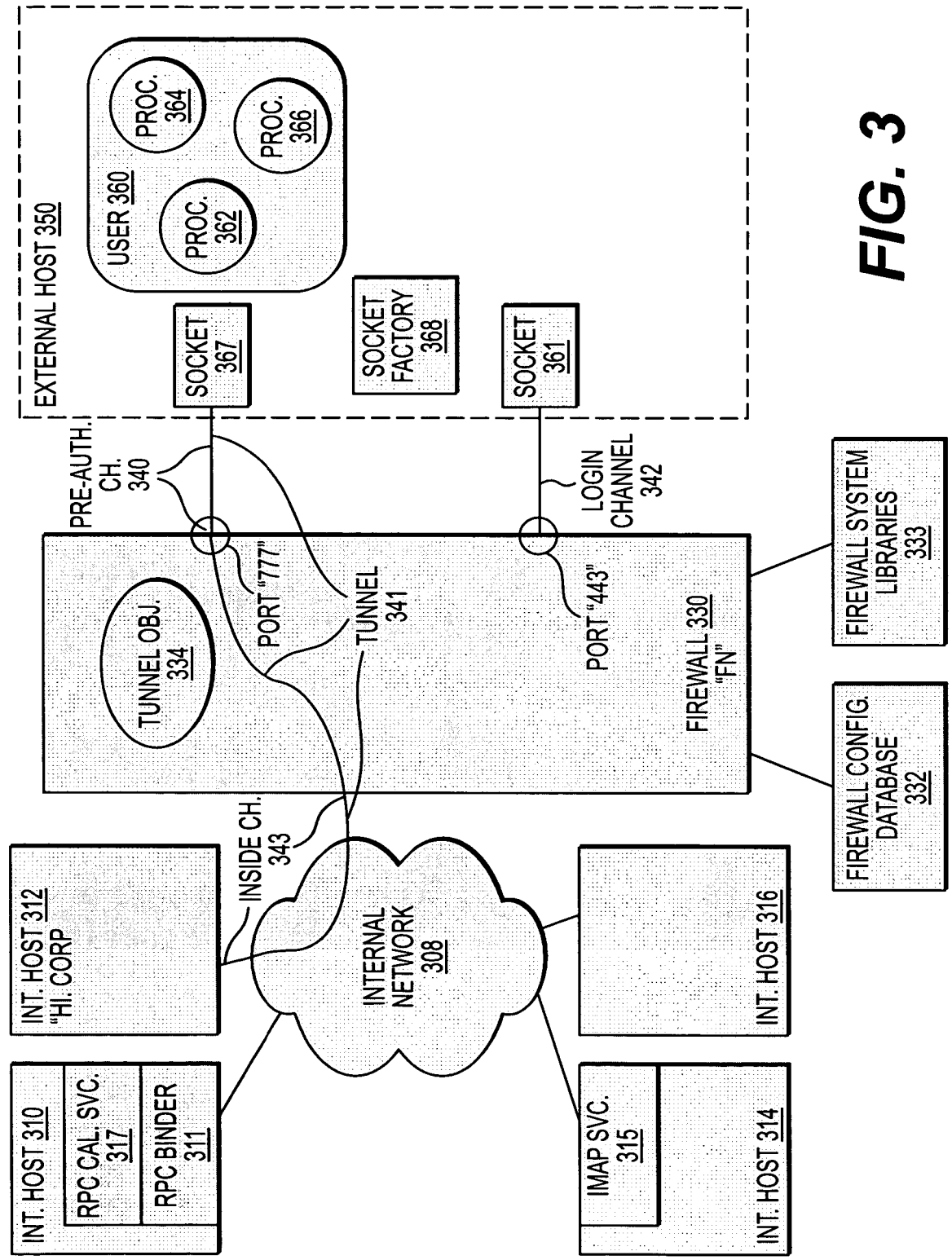
FIG. 3 is a block diagram showing an exemplary network architecture upon which an embodiment of the present invention may implemented.

FIG. 3 is a block diagram that shows an exemplary network architecture used to illustrate an embodiment of the invention. Internal network 308 is a LAN that is protected from other external networks, such as the Internet 228, by a firewall 330. Firewall 330 may consist of one or more cooperating hosts. Host 310, host 312, host 314, host 316 are several of the hosts and resources on internal network 308. External host 350 is a host linked to the Internet 228. A process running on external host 350 may connect to a host on internal network 308 in manner which shall be described in more detail. Firewall 330, host 310, host 312, host 314, host 316, and external host 350 are each associated with a network address, such as an Internet Protocol ("IP") address.

A user, such as user 360, is an entity on whose behalf one or more processes are executing. A user may be, an individual, or another process. For example, process 362 may be a web browser displaying web pages to user 360. Web browsers are processes running software that sends and receives data from servers that participate in the World Wide Web. Web browsers may also load code, such as Java™ code, and execute such code or launch processes which execute the code. Examples of browsers are Microsoft Corporation's Internet Explorer, or Netscape Corporation's Navigator. Process 364 and process 366 are Java applications executing code loaded by process 362. Such Java applications include the HotJava™ browser, available from Sun Microsystems, Incorporated.

A process that is associated with the user is referred to as a user process. Process 362, process 364, and process 366 are each examples of user processes.

Socket factory 368 resides on external host 350. A socket factory provides sockets. A socket is a set of code modules and related data that serves as an interface for communicating between processes, including processes on two or more hosts linked by a network. Sockets typically provide an interface to a channel, such as a connection, between two processes. Sockets insulate users of sockets (e.g. processes) from the complexities of communicating with other processes.

In one embodiment of the present invention, a socket factory and a socket are objects which are instantiations of classes developed in object-oriented software. For example, socket factory 368 is an instantiation of a socket factory class.

A socket may be an object that provides a set of methods which may be invoked for the purposes of communicating with another process. For example, one method may be invoked to establish a connection with a process associated with a particular IP address and a port. Another method may be invoked to transmit data to the other process, and yet another method may be invoked to terminate the connection.

The techniques described herein are not limited to object oriented software. For example, object classes correspond to abstract data types, objects correspond to instances of abstract data types, and the methods of an object correspond to the functions that are used to perform operations on data contained in instances of abstract data types.

Firewall configuration data 332 is data that is used to configure firewall 330. A portion of firewall configuration data 332 may reside on other hosts, including internal hosts. For example, firewall configuration data 332 may include data (1) specifying that network traffic from one source be blocked, (2) network traffic from another source be rerouted to another network, (3) user profile data, and (4) data available through user authentication services. Firewall configuration data 332 contains other types of configuration data which shall be described later.

Overview

FIG. 3 shows a tunnel according to an embodiment of the present invention. Tunnel 341 is an exemplary tunnel through which a user process may connect to an internal host behind firewall 330.

In accordance with an embodiment of the present invention, one or more tunnels are associated with a user. Access through a firewall is based on the user associated with a process. Thus, once it has been determined that access may be granted to the user associated with a process, access may be securely permitted even though the process may reside on an external host. Security may be managed at a finer level of control than that provided by mechanisms based solely on a user's host. Furthermore, the overhead by operating firewall 132 to consolidate traffic through a primary network becomes optional so that users on a partially trusted host 182 (or 350) can be granted selective access.

Login channel 342 is used to authenticate a user to the firewall. Usually the login channel is to a well known login port on firewall 330, such as port 443. A login channel can be set up without user authentication. After setting up the channel, login is performed.

Tunnel 341 includes a user-authenticated channel 340. A user-authenticated channel is a secure channel through which a user process associated with an unterminated session on a firewall may connect to the firewall through a tunnel entry port (e.g. port 777). A tunnel entry port is the port on a firewall corresponding to a particular user-authenticated channel. Tunnel 341 also includes inside channel 343, which represents the portion of a tunnel 341 between the firewall and the respective internal host. A port corresponding to an inside channel on the internal host is referred to as an inside port.

A user process on an external host 350 may establish a tunnel 341 after logging in to access a service provided by the internal host 312. A service is a set of processes that provides functionality for other processes, including processes on a different host. Examples of services are an FTP server (a server which sends/receives according to the "file transfer protocol"), an IMAP 315 server (an electronic mail server that follows the internet mail access protocol) or RPC Calendar 317 (a scheduling service that uses remote procedure calls). The functionality provided by a service can be made available to a process by connecting to a particular host at a designated port. For example, the RPC calendar service 317 is available on host 310.

User process 362 on external host 350 may communicate to internal host 312 behind the firewall 330 by requesting a socket from socket factory 368 configured to connect the user process 362 to the internal host 312 via a tunnel. A socket 367 which is configured to connect a user process 362 to an internal host 312 through a tunnel 341 is referred to as a tunnel socket. From the perspective of the user process 362, tunnel socket 367 is requested as a connection to the internal host 312 and appears as a connection to the internal host 312, even though the tunnel socket 367 is configured to use a tunnel 341.

Before tunnel socket 367 may be created for user process 362, a secure session associated with the respective user 360 must be established with the firewall 330. When the user logs in and establishes a secure session, information on how to configure tunnel sockets is transmitted to user process 362. The tunnel configuration data received includes, for example, a tunnel entry port to which to connect in order to connect to a particular internal service. When a user process on an external host requests a socket to the particular internal host, the socket factory uses the tunnel configuration data to configure a tunnel socket.

When user process 362 attempts to establish a connection to internal host 312 and port using tunnel socket 367, firewall 330 determines whether a tunnel is permitted to connect user process 362 to the sought internal host 312 and port. If so, the firewall 330 determines the configuration of a channel between firewall 330 and the sought internal host 312 and port, and establishes a connection through the channel accordingly. Thus, user process 362 communicates to internal host 312 through user-authenticated channel 340 between firewall 330 and user process 362, and through inside channel 343 between firewall 330 and internal host 312.

When a connection through a tunnel is established, a tunnel object 334 is created for user channel 340 and inside channel 343. One or more methods of the tunnel object are executed to configure and establish inside channel 343. Through the power and simplicity of the inheritance feature of object oriented programming, a set of classes may be implemented to configure inside channels in a variety of manners. For example, a firewall may authenticate in turn to another firewall, could monitor traffic to ensure that some particular security policy is obeyed, or use a particular encryption protocol. Likewise, a set of classes may be implemented to configure sockets in a variety of manners.

Establishing Session and Configuring the Socket Factory

Figure 4:
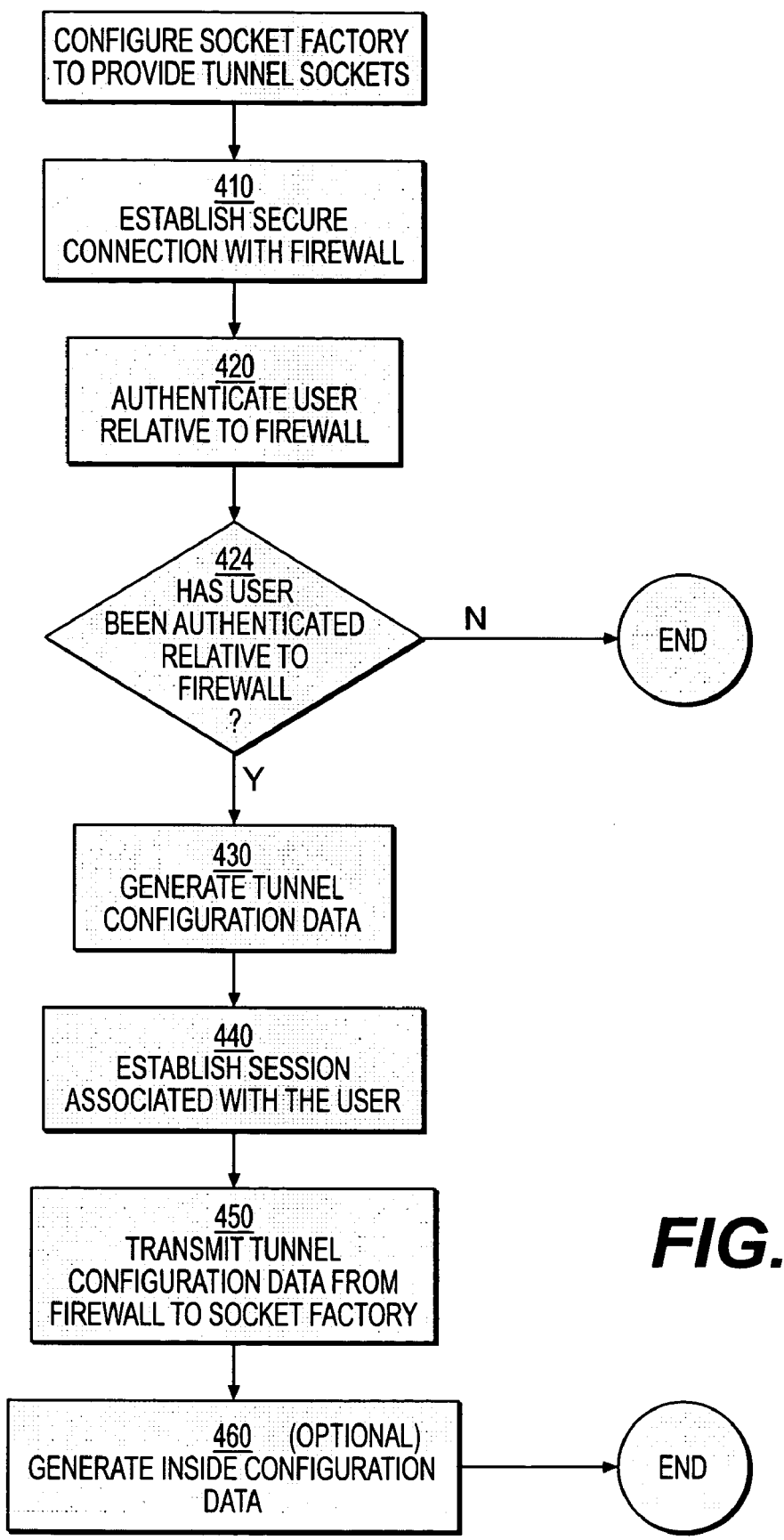
FIG. 4 is a flow chart showing steps for configuring a socket factory to provide tunnel sockets in accordance with an embodiment of the present invention.

FIG. 4 shows the steps performed to establish a session and to configure socket factory 368 to provide tunnel sockets. The steps may be performed in response to user process 362 on external host 350 logging into firewall 330 for the purposes of accessing a service on internal host 132. The steps in FIG. 4 are illustrated using the exemplary network architecture shown in FIG. 3. Assume user process 362 is initiating a connection to internal host 312.

At step 410, a secure connection between the external host 350 and firewall 330 is established through login channel 342. A secure connection provides for the secure transmission of data by, for example, the encryption of data. A secure connection may be established using the Secure Sockets Layer (SSL) protocol for establishing secure connections as originally defined by Netscape Corporation. Those skilled in the art will recognize that there are many techniques for establishing secure connections, and those techniques shall not be further described. In this example, assume user process 362 creates socket 361 to establish a secure connection through login channel 342 to firewall 330.

At step 420, the user is authenticated relative to the firewall 330. Authentication, as referred to herein, is the process of receiving information used to identify a user, and using the information to verify that the user is what or who the user has been identified to be. The user's authenticated identify is used to determine the what acts may be performed by or on behalf of the user, which act is referred to as "authorization." Authenticating the user is a central part of setting up the user session. It generally involves either secrets known to the user, or secrets held by the user in a privacy protected file, hardware token, or both.

Authentication relative to the firewall 330 refers to authenticating user 360 and determining whether user 360 may traverse the firewall 330. If the user 360 is what or who it has been identified to be, the user 360 is considered verified. If the user 360 is verified, and it is determined that the user 360 may traverse the firewall 330, the user is considered authenticated relative to the firewall 330. The present invention is not limited to any particular technique for authenticating users. In fact, user authentication can be delegated to a separate user authentication service module, which can support a variety of authentication schemes.

One well known authentication technique is the "Basic Username/Passphrase" authentication. In "Basic Username/Passphrase" authentication, a user supplies a name and phrase to the firewall 330 over a secure channel. The firewall 330 then looks up the name and phrase pair in a database of valid pairs of names and phrases. If the name and phrase match valid pairs stored in the database, then the user 360 is considered to be authenticated relative to the firewall 330.

Another well known technique is "Challenge/Response" authentication. In the challenge response authentication, a user supplies a user name and is then challenged by being prompted for another response. The firewall 330 calculates a correct response according to a mechanism supplied to both the firewall 330 and authentic users. If the user response matches the correct response, then the user is considered verified.

Another authentication technique is the SSL authentication protocol, available from Netscape corporation and others. SSL authentication provides for "strong" authentication. In strong authentication, a certificate and a digital signature generated from digitally encrypted randomly generated data is transmitted to the firewall. A certificate is data about a user, and includes data identifying the user and data used for encryption purposes (e.g. public key). Firewall 330 uses the certificate and the digital signature to verify the user using encryption-based techniques well known to those skilled in the art, including those described in Schneier, "Applied Cryptography", 1996.

At step 424, a determination is made as to whether the user has been authenticated relative to firewall 330. If the user has not been authenticated relative to the firewall, then execution of the steps ceases. Otherwise, control passes to step 430.

In this example, assume user 360, the user associated with user process 362, is authenticated using strong authentication. After user 360 is verified, firewall 330 looks-up user 360 in the database, based on data identifying the user received in the certificate sent to firewall 330 in accordance with the SSL protocol. Execution of the steps thus flows to step 430.

At step 430, tunnel configuration data is generated. Tunnel configuration data describes the tunnels through which connections may be established for a particular user. Tunnel configuration data includes the session id of the current session associated with a user, data defining the tunnels through which connections may be established for a particular user, and, for each tunnel, the manner in which the tunnel is created. For example, tunnel configuration data may include, for each tunnel, data indicating the tunnel entry port, and which encryption protocols to use. The configuration data may specify which third party digital signature authenticators to use, (e.g. Verisign Incorporated), whether to use a low level security mechanism, (e.g. Internet Protocol Security Protocol, "IPSEC", a set of low level security protocols established by the Internet Engineering Task Force), or a high level mechanism, (e.g. Transport Layer Security, "TLS", a modified version of SSL), whether weak 40 bit ciphers are allowed, and which ciphers to use, for example, RC4 or DES. Tunnel configuration data may be generated from firewall configuration data 332 (e.g. user profile data), the internal state of the firewall, and information about the host from which the user is accessing the firewall.

At step 440, a session with the firewall 330 is established. A session is a set of zero or more tunnels that are associated with a user, the user's user profile data, and tunnel configuration data. A session is said to be established upon the occurrence of a session enabling event, and terminated upon the occurrence of a session terminating event. A session which has been established and not terminated is referred to as an active session. An example of a session enabling event is the authentication of a user relative to the firewall which occurs while no session associated with the user is active. An example of a session terminating event is the lapse of a period of time in which no connection associated with a user is established.

For example, a first process associated with user 360 transmits a first request to connect to a firewall 330 over a first channel. The connection request includes information identifying a first session which is no longer active. The user 360 is then authenticated again relative to firewall 330 using login channel 342. The authentication of user 360 represents a session enabling event because user 360 is associated with a session that is no longer active. Thus, a first session, as well as the new connection, are established.

Assume that after the first connection is established, another user process associated with user 360 transmits another request for a second connection over a second channel 340. The request would include information identifying the first session. When the requested second connection is established, the second connection is associated with the first session. Then assume that the first and second connections are terminated, and a period of time lapses, at which point the first session is terminated. The lapse of a period of time in which there is no connection associated with an active session represents one kind of session terminating event. Other kinds of session terminating events include explicit action by the user (e.g. "log out") or firewall administrator.

Session data is maintained for each session. Session data includes the identity of the user (user id) associated with the session, user profile data, a session identifier ("session id"), and tunnel configuration data. Firewall 330 generates session data, including the session id and the user id.

The session established in step 440 is referred to as the current session. The session data and session id associated with the current session are referred to as the current session data and current session id. In this example, a current session associated with user 360 is established.

Referring to FIG. 5A, tunnel configuration table 510 is an example of session specific data included in tunnel configuration data. Tunnel configuration data maps internal services to specific tunnel entry ports. Tunnel configuration table 510 is associated with a login session for user 360, and contains four entries. Each entry corresponds to a tunnel through which a user process associated with user 360 may connect to a particular service, and maps a particular internal service to the respective tunnel entry port of the tunnel. Each entry has four fields, an internal host 522, internal port 524, firewall host 526, and tunnel entry port 528. In this example, internal host 522 and internal port 524 are used to identify the service mapped to firewall host 526 and tunnel entry port 528. It is not necessary that a host and port be used to identify a service mapped to a specific tunnel entry port. For example, a service name can be used to identify the internal service.

For the tunnel represented by a particular entry, the internal host and port specified by the values of internal host field 522 and internal port field 524 is considered mapped to the tunnel entry port specified by the values of the firewall host field 526 and firewall port field 528. A connection through a tunnel may be established for a user process to a port on an internal host by creating a connection from the host on which the user process resides to the tunnel entry port mapped to the internal host and port. This connection represents a connection through the user-authenticated channel of the tunnel.

For example, consider entry 512. Entry 512 represents tunnel 341 (FIG. 3), and maps port 143 on h1.corp (host 312) to the tunnel entry port represented by port 777 (FIG. 3) on FW1 (firewall 330). H1.corp is the domain name for host 312 and FW1 is the domain name for firewall 330. A domain name is a string representing a particular network address, such as an IP address. A domain name includes one or more sub-names (e.g. "H1", "corp"), delimited by a punctuation character, such as a period ("."). A connection through tunnel 341 may be created for user process 362 associated with user 360 to port 143 on an internal host 312 (h1.corp) by creating a connection, from a port on the external host, to the tunnel entry port represented by port 777 on firewall 330. This connection represents a connection through user-authentication channel 340 (FIG. 3) With respect to tunnel 341, channel 340 is referred to as a user-authenticated channel.

At step 450, the tunnel configuration data is transmitted to user process 362 using login channel 342. User process 362 then configures socket factory 368 by invoking one or more of its methods (e.g. constructor method). In this example, the tunnel configuration data is transmitted to user process 362. The tunnel configuration data includes the current session id of user 360 and tunnel configuration table 510. User process 362 then invokes a method of socket factory 368, passing in the tunnel configuration data needed for configuration.

Step 460 is optional. At step 460, inside configuration data is generated for the user and stored as part of the session associated with the user. Inside configuration data is used to define the configuration for each tunnel defined for a particular user. Inside configuration data may be generated by retrieving from firewall configuration data 332 the inside configuration data associated with a particular user.

In one embodiment of present invention, the configuration of the inside channel is determined on demand. Specifically, when a user process attempts to access an internal server through firewall 330 by connecting to a tunnel entry port, the firewall examines firewall configuration data 332 to determine the configuration of the appropriate inside channel. Determining the configuration on demand may be more efficient because computer resources are not expended determining and storing configurations of inside channels that may never be used.

Referring to FIG. 5B, inside channel table 550 is an example of predetermined inside configuration data stored as part of the session data of a session associated with a user. Each entry in inside channel table 550 corresponds to a tunnel defined for user 360, and maps the tunnel entry port of the respective tunnel to the inside channel for the tunnel. Each entry has three fields, a firewall field 562, firewall port field 564, and inside channel field 566. For a particular entry, the tunnel entry port specified by the values of the firewall field 562 and firewall port field 564 is considered mapped to the inside channel field 566. For example, entry 560 maps the tunnel entry port represented by port 777 (FIG. 3) on firewall 330 to inside channel 343. In this example, inside channel table 550 is stored as part of the current session associated with user 360.

Generating a Tunnel Socket

Figure 6:
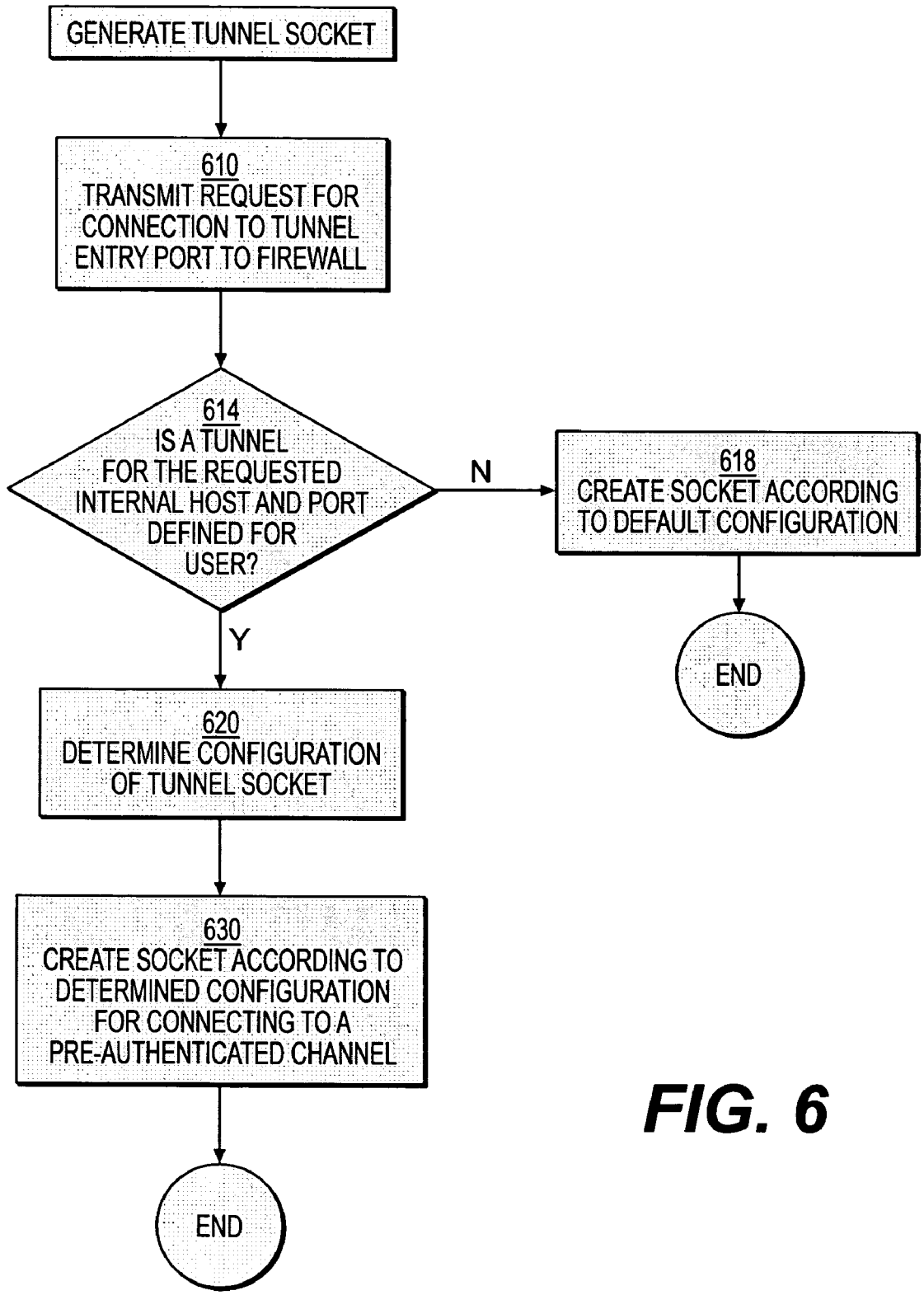
FIG. 6 is flow chart showing steps for generating a tunnel socket according to an embodiment of the present invention.

In order to connect with an internal service from an external host, a tunnel socket is created on the external host. To create a tunnel socket, a user process transmits to a socket factory data specifying the internal host (e.g. host and port) with which to establish a connection. In response, the socket factory creates and configures a tunnel socket to connect to the internal host through the tunnel via the tunnel entry port for the tunnel. The tunnel socket is configured based on the tunnel configuration data known to both the client and the firewall. FIG. 6 shows the steps for generating a tunnel socket. FIG. 6 shall be explained with reference to the example provided for FIG. 4.

At step 610, a user process transmits a request for a socket to socket factory 368, for example, by invoking a method of the socket factory. The request includes data specifying the internal host and port to which to establish a connection, herein referred to as the requested host and port. The request also includes data identifying the user session associated with the user process.

In this example, user process 362 transmits a request for a socket to socket factory 368 by invoking a method of socket factory 368. The request includes the data specifying that the requested host and port is h1.corp (host 312), port 143. Data identifying the session for user 360 is also available as part of the request.

At step 614, a determination is made as to whether a tunnel for connecting to the requested host and port is defined for the user. If a tunnel for connecting to the requested host and port is not defined, then control flows to step 618. At step 618, a tunnel is created according to a default configuration, such as a socket configuration for connecting to the requested host and port for a host on some network not protected by the firewall according to standard TCP/IP protocols. If, on the other hand, a tunnel for connecting to the requested host and port is defined, control flows to step 620.

The determination as to whether a tunnel for connecting to the requested host and port is made by examining the tunnel configuration data associated with the user, and determining whether the tunnel configuration data specifies a tunnel for the requested host and port. In this example, the determination of whether the tunnel configuration data specifies a tunnel for the requested host and port is made by searching for an entry in the tunnel configuration table 510 (FIG. 5A) that has a host field and internal port field that matches the requested host and port. If a match is found, then the tunnel configuration data specifies a tunnel for the requested host and port.

Referring to FIG. 5A, the values of internal host and internal port of entry 512 explicitly match the h1.corp, port 143 (the requested internal host and port). Entry 518 matches as well. The wild card character "*" in "*.corp", the value of the internal host field of entry 518, specifies that the value matches any sequence of subnames followed by ".corp". The use of wild card characters and techniques for determining values that match a value containing one or more wild card characters are well known to those skilled in the art. Because at least one match was found, control flows to step 620.

At step 620, the configuration of the tunnel socket is determined. Determining the configuration of the tunnel socket includes determining the tunnel entry port for the tunnel to the requested host and port.

In one embodiment of the invention, the tunnel entry port is the tunnel entry port mapped to the requested internal host and port that most closely matches the requested internal host and port in the user's tunnel configuration table. The closest matching entry is the entry having the value for the internal port field that equals the requested port, and a value for internal host field that most expressly matches the domain name of the requested host. In this example, internal port values of both entries 512 and 518 in tunnel configuration table 510 both match the internal port. However, the domain name of the requested host ("h1.corp") more expressly matches the internal host value of entry 512 ("h1.corp") than the internal host value of entry 518

("*.corp"). Thus, FW1 and port 777 represent the firewall and port of the required user-authenticated channel.

In addition to configuring the tunnel socket for the tunnel entry port, the configuration of other aspects of sockets may be determined. For example, as mentioned earlier tunnel configuration data may specify a particular encryption protocol to be used for a particular tunnel. The configuration of the tunnel socket's encryption protocol may be determined based on tunnel configuration data.

At step 630, the tunnel socket is generated according to the configuration determined in step 620. Generating a socket includes allocating memory to data structures and objects defined by the class to which the socket belongs, and initializing those data structures and objects, which may be initialized according to the configuration determined in step 620.

When generating a socket, a constructor method associated with the socket class may be invoked. Values for parameters passed to the constructor method may be based on the configuration determined in step 620. The constructor method, in turn, may base the configuration of the socket on the values passed in as parameters. In this example, a constructor method is invoked to create a tunnel socket 367 (FIG. 3), passing in the values for the tunnel entry port corresponding to the required user-authentication channel i.e. "FW1" and 777.

Creating a Connection Through a Tunnel

Once a user-authenticated channel is established by a socket factory as an interface to a tunnel, it may be used to establish a connection to the internal host and port for which the tunnel socket is configured. The tunnel consists of two connections: a first one established by the client to the firewall, and a second one established by the firewall to the inside host. Those connections actualize channels which are identified in tunnel configuration data shared between client and firewall systems.

Typically, that first connection is established by invoking a connection method of the tunnel socket. In response to host 350 invoking the connection method, a request is transmitted, via the creation of a user authenticated channel for which the socket is configured, for the establishment of a connection with the firewall. When the firewall receives the request, the firewall determines whether a connection 341 to the tunnel entry port 528 should be established. If a tunnel should be established, the firewall establishes a second connection to the internal host. The second connection is the inside channel.

Figure 7:
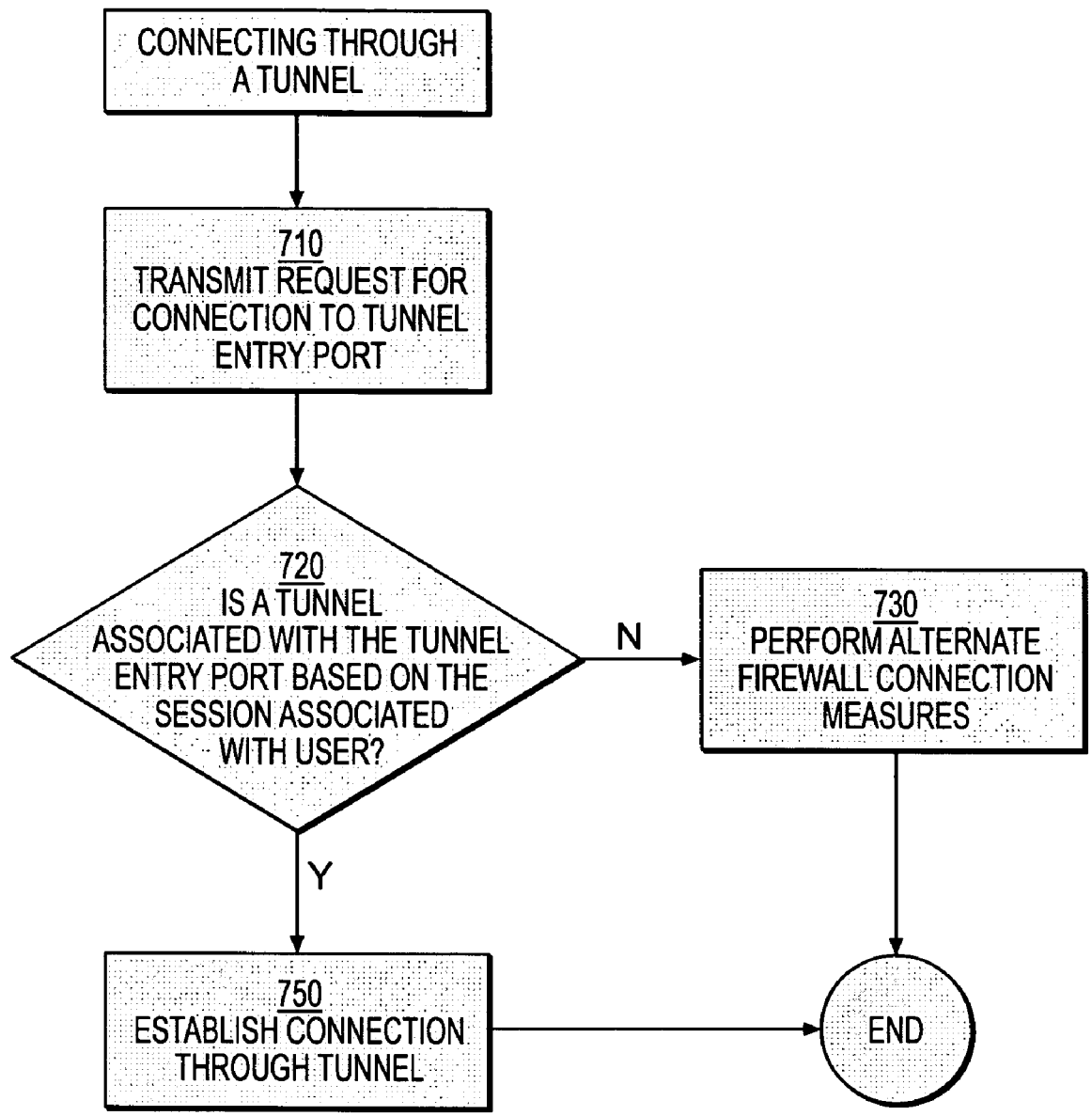
FIG. 7 is a flow chart showing steps for connecting through a tunnel in accordance with an embodiment of the present invention.

FIG. 7 shows steps performed for connecting to an internal host through a tunnel. The steps are explained with reference to the example described above in which user 360 is attempting to connect to host 312.

At step 710, a request for a connection to a tunnel entry port ("requested tunnel entry port") is transmitted to the firewall. The request is transmitted in response to, for example, a user process invoking a "connect" method of a tunnel socket configured for the tunnel. The request includes data indicating the session id of the session associated with the respective user. The request is herein referred to as the connection request. In this example, the connect method of tunnel socket 367 is invoked.

At step 720, a determination is made as to whether a tunnel has been defined that is associated with the requested tunnel entry port, based on the session associated with the user. The firewall makes this determination by examining the tunnel configuration data stored as part of the session data associated with the user. If the tunnel data indicates that a tunnel has been defined for the user, then control flows to step 750. Otherwise, control flows to step 730, where alternate firewall connection request management measures are followed, such as measures for failing the connection request.

In this example, firewall 330 examines tunnel configuration table 510 (FIG. 5A), the tunnel configuration data stored as part of the session data associated with the user. If tunnel configuration table 510 contains an entry that corresponds to the requested tunnel entry port, then a tunnel has been defined for the tunnel entry port.

Inside the firewall, associated with the tunnel configuration data is an inside channel table 550 (FIG. 5B) which may contain entries identifying the inside connections associated with the defined inside channels. For example, corresponding to entry 512 is entry 560, recording that a connection 343 has already been created to support that particular tunnel. In this case the tunnel has not only been defined, but it has also been fully established.

As mentioned before, in alternate embodiments of the present invention, the inside configuration may be determined on demand. The on demand determination is made by techniques shortly to be described.

At step 750, a connection through the tunnel is established. Several exemplary methods for establishing a connection are shown in FIG. 8 and FIG. 9, and shall be described in further detail.

Firewall-mapped Inside Channels

Figure 8:
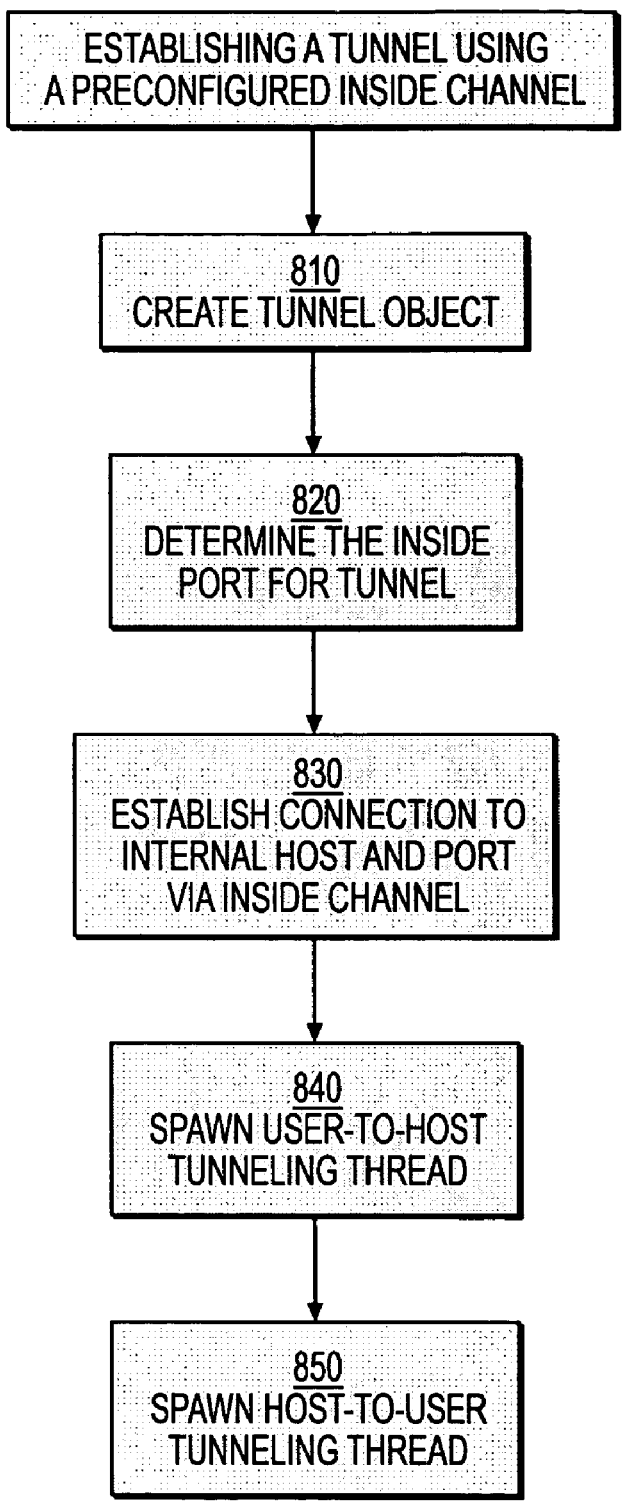
FIG. 8 is a flow chart showing steps for establishing a connection through a tunnel using the "firewall-mapped" approach in accordance with an embodiment of the present invention.
Figure 9:
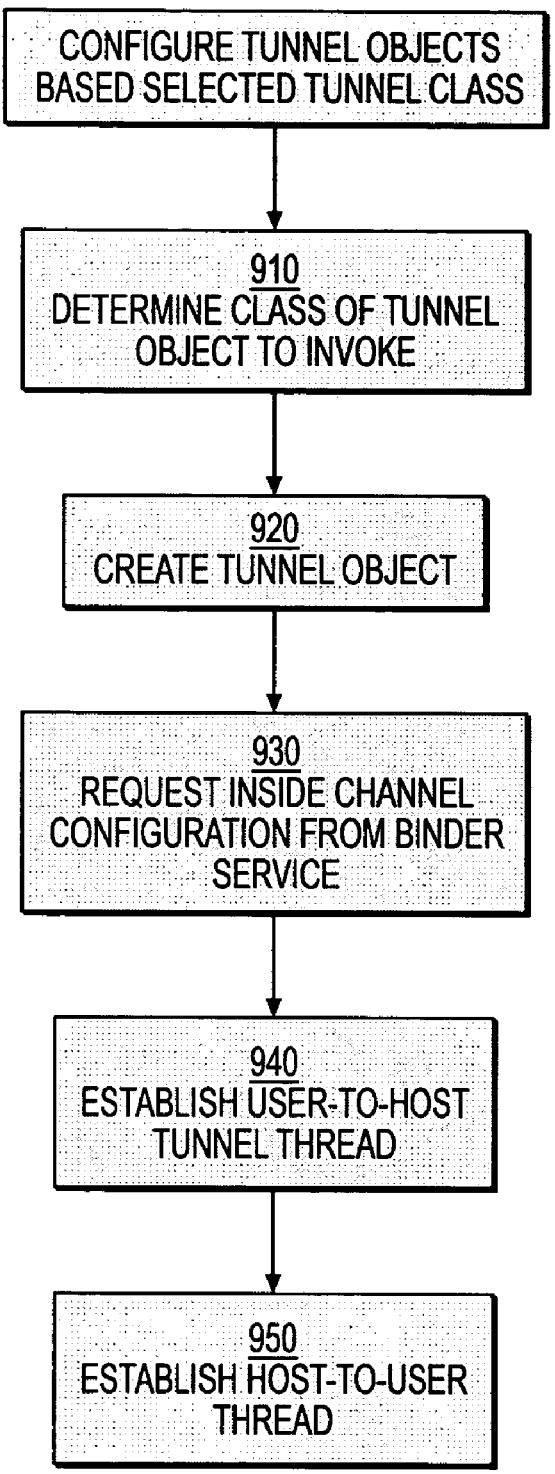
FIG. 9 is a flow chart showing steps for establishing a connection through a tunnel using the "class-based" approach in accordance with an embodiment of the present invention.

FIG. 8 shows steps for establishing a tunnel according to the method referred to herein as the "firewall-mapped" approach. To establish a connection through a tunnel under the "Firewall-mapped" approach, first a determination is made as to the inside channel through which to establish a connection between the firewall and the requested internal host and port. Under the "firewall-mapped" approach, this determination is based on an inside port-to-tunnel-entry-port mapping that resides within firewall 330 for the user of the current session (e.g. inside configuration data stored in firewall configuration data 332).

Next, a connection is established from firewall 330 to the requested internal host and port through the just determined tunnel inside channel, and recorded in inside channel configuration table. Once the connection is established, firewall 330 receives data from the respective user process via the user-authenticated channel for the tunnel and transmits the data to the respective internal host via the inside channel. The respective internal host transmits data to firewall 330 via the inside channel. Firewall 330, in turn, transmits the data to the respective user process on which the user resides via the user-authenticated channel.

At step 810, a tunnel object is created. A tunnel object is an instantiation of a class referred to as a tunnel class. The definition and implementation (i.e. code) of a tunnel class is stored in the firewall system libraries 333. In this example, tunnel object 334 is created as an instantiation of a tunnel class.

Steps 820 through 850 are performed during the execution of the constructor method invoked in step 810. The steps may be executed by code that is part of the implementation of the constructor method, or by code in methods, functions, or other procedures invoked directly or indirectly by the constructor method.

At step 820, a determination is made as to the inside channel that corresponds to the requested tunnel by examining the inside configuration data. As mentioned before, the inside configuration data is part of the session data. In this example, the inside channel table 550 is examined. Entry 560 indicates that the required tunnel entry port is mapped to inside channel 343.

At step 830, a connection to the requested internal host and port is established via the inside channel, using any number of techniques well known to those skilled in the art. In this example, a tunnel socket is created for connecting through inside channel 343. During execution of the constructor method, the connection through inside channel 343, is established.

At step 840, a user-to-host tunneling thread is spawned. A user-to-host tunneling thread receives data from a user process via the user-authenticated channel and transmits the data to the internal host via the inside channel. In this example, a user-host tunneling thread is spawned.

At step 850, a host-to-user tunneling thread is spawned. A host-to-user tunneling thread receives data from the internal host via the inside channel and transmits the data to the internal host via the user-authenticated channel. In this example, a host-user tunneling thread is spawned.

Rather than spawning two threads to transfer data between the internal and external hosts through the firewall (i.e. as in steps 840 and 850), an asynchronous I/O scheme may be used. The asynchronous scheme requires far fewer threads to pass the data between hosts. Examples of asynchronous scheme mechanisms include "poll" and "select" system calls available on UNIX, and "WaitMultipleEvents" on the Microsoft Win32 platform.

Class-based Tunnel Objects

Figure 10:
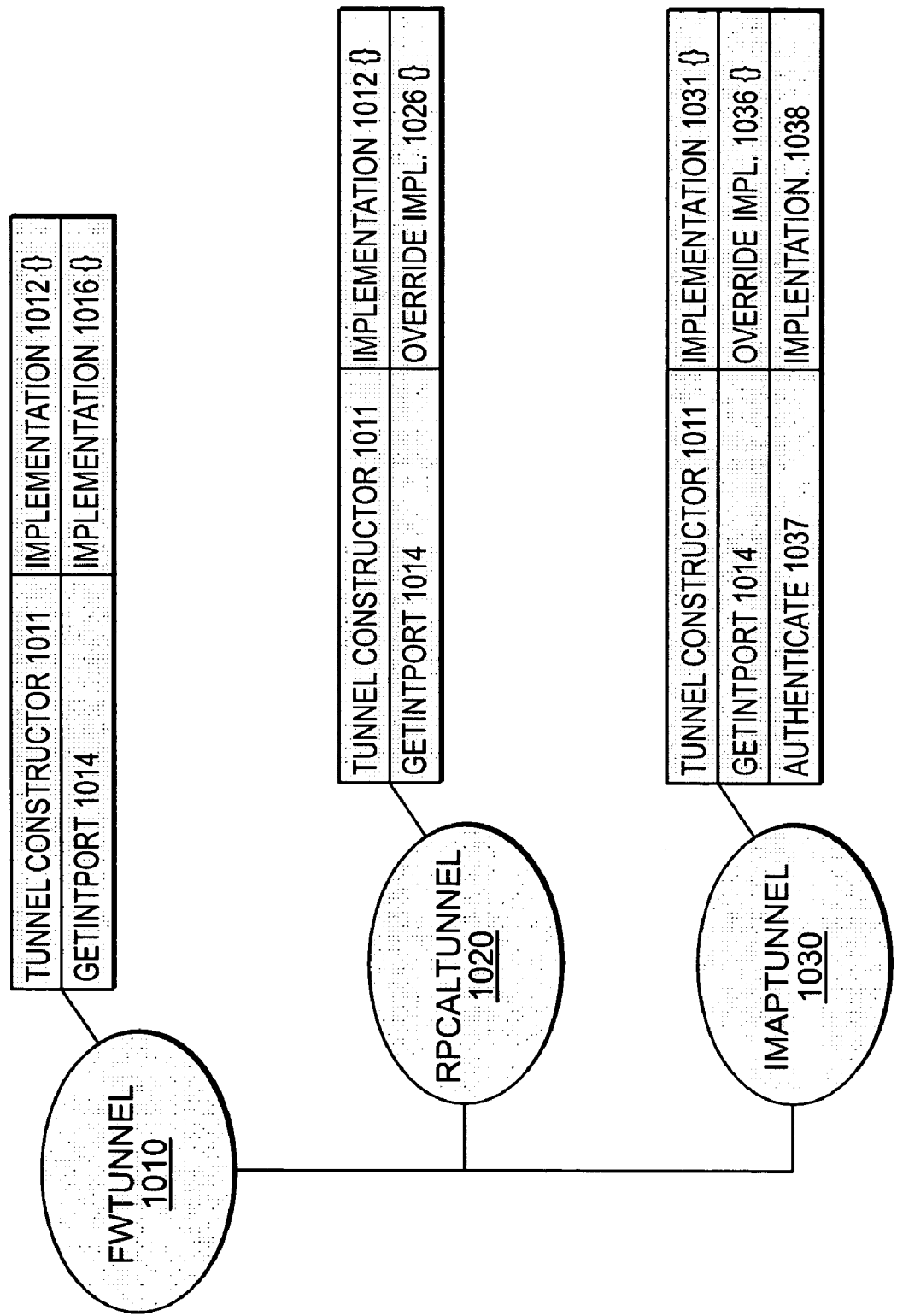
FIG. 10 is a block diagram of an exemplary hierarchy of tunnel classes which may implemented for use according to the class-based approach in an embodiment of the present invention.

FIG. 9 shows the steps for establishing a tunnel according to the method referred to herein as the "Class-based" approach. Under the class-based approach, the manner in which a tunnel is established depends on the tunnel class selected to instiantiate a tunnel object. FIG. 10 depicts classes from which tunnel objects may be created as instances. These classes shall be described in further detail. Under the "Class-based" approach, a connection through a tunnel may be established according to a variety of approaches. These different approaches may be necessitated by the needs of different kinds of application protocols. The firewall may be configured to permit secure tunneling to specific applications. Without this flexibility, only simple applications can be supported.

At step 910, a determination is made as to the tunnel class of the tunnel object to create in order to establish the tunnel. The determination may be made using a variety of techniques. For example, the inside configuration data may contain an algorithmic mapping of tunnel entry ports to tunnel classes rather than a static mapping. The determination of the tunnel class is made by finding the class that is mapped to the requested tunnel entry port.

It should be noted that some services are, by convention, consistently assigned to the same port. An example of such a service is a web server which is by convention assigned to port 90, or an FTP server which is by convention assigned to 21. Ports to which other services are assigned may vary. For example, RPC calendar service 317 may be assigned to a port by an RPC binder 311. An RPC binder maps an RPC service name to a specific port on a specific machine. In particular, an RPC binder may map RPC service 100068 (i.e. RPC calendar service 317) to port number 2097 at one moment, and later to port 3722. This precludes the use of static mappings in tunnel configuration data for this class of applications.

For illustrative purposes, assume that the tunnel configuration data associated with a given firewall entry port identifies it as providing access to the RPC calendar service on some host, or for some user. Based on this data, it is determined that the class of the tunnel object is RPCalTunnel, a tunnel class provided in firewall system libraries 333 for the RPC Calendar service 317. That application requires specialized procedures to use the inside channel, accessible through class RPCalTunnel. Furthermore, while that class just could establish a tunnel connection and just pass data, it might also act as an application level proxy.

Finally, a default tunnel class may be used to create the tunnel class when, for example, no class is mapped to the requested tunnel port, or no particular class is provided in the firewall system libraries for the sought service, or no data indicating a sought service is received.

After determining the tunnel class in step 910, at step 920, a tunnel object is created by invoking the constructor of the tunnel class. For example, a tunnel object may be created as an instantiation of RPCalTunnel 1020 (FIG. 10).

Steps 930 through 950 are performed during the execution of the constructor method invoked as part of creating the object created in step 920. The steps may be executed by code that is part of the implementation of the constructor method, or by code in methods or functions invoked directly or indirectly by the constructor method.

At step 930, the inside channel configuration is determined. Determining the inside channel configuration involves determining the inside port and other aspects of the inside channel. Such additional aspects include the user identity with which the channel must be authenticated, the level of privacy required, the priority for such traffic, and the quality of service needed. The inside port can be determined using a variety of approaches. One approach for determining the inside port is the firewall-mapped inside channel approach (specifically, step 820 in FIG. 8), previously described.

Another approach is the service mapped approach, which supports one kind of algorithmic mapping for tunnel configuration data to inside channels. In the service mapped approach, the inside port is supplied by an internal service (i.e. a service provided on an internal host.). For example, a tunnel object may transmit to RPC binder 311 a request for data indicating the port and host to which the RPC Calendar service 317 is assigned. In response, RPC binder 311 returns the port and host assigned to the RPC Calendar service.

The particular approach used for determining the inside port may depend on the particular class to which the tunnel object belongs. In addition, the configuration of other aspects of the tunnel objects depends on the particular class.

At step 940, a user-to-host tunneling thread is spawned. At step 950, a host-to-user tunneling thread is spawned.

Tailoring Configurations of Sockets and Tunnel Objects Through Inheritance

Tunnel objects and tunnel socket objects may be specially configured to establish a connection in a way that takes advantage of the power and simplicity of the inheritance feature of object oriented software. Inheritance allows a hierarchy to be established between classes. The attributes and methods of a class automatically become attributes and methods of the classes that are based upon the given class in the hierarchy. A class which inherits its attributes and methods from another class is said to be a subclass of the other class. The one or more classes from which the subclass inherited its attributes and methods are said to be a super classes relative to the subclass. For example, consider a class hierarchy in which class TERRIER inherits its attributes and methods from class DOG, which in turn inherits its class and methods from class ANIMAL. Class TERRIER is a subclass of class DOG and class ANIMAL. Class DOG is a subclass of class ANIMAL. Class DOG is a super class to class TERRIER, and class ANIMAL is super class to class DOG and class TERRIER.

Note the term routine, as used herein, is synonymous to method, when used relative to a class. For example, a method defined by a class may also be referred to as a routine defined by a class. A method may be defined for a class even though the class does not define an implementation (i.e. code) for the method. For example, the class ANIMAL may define the method SOUND without providing any implementation. The class DOG, which inherits the method SOUND, may define an implementation for SOUND which generates a generic bark. The class TERRIER, which inherits method SOUND, may define an implementation for SOUND that generates a terrier's bark. Such an implementation is said to be an override implementation. An override implementation is code executed for the subclass for a method inherited from a superclass in place of any code, if any, defined for the method by the superclass.

FIG. 10 shows an exemplary hierarchy of classes that may be implemented for use in accordance with the class-based approach. FWTunnel 1010 is a superclass of subclasses RPCalTunnel 1020 and IMAPTunnel 1030. FWTunnel 1010 is a class that provides a default mechanism for establishing connections through tunnels. RPCalTunnel 1020 is class for establishing connections through tunnels to RPC calender services, while the IMAPTunnel is a class for establishing connections through tunnels to IMAP services.

When an object is instantiated from FWTunnel 1010, a connection to a tunnel is established in accordance with the class-based tunnel objects approach shown in FIG. 9. The GetIntPort 1014 method is a method invoked by tunnel constructor method 1011 in order to determine the inside port (e.g. step 930). This implementation uses the "firewall mapped" approach to determine the inside port. Performance of the other steps described for FIG. 9 (e.g. 940, 950) are performed by code in the tunnel constructor method, or other methods or functions, invoked, directly or indirectly, by tunnel constructor method 1011. An implementation is executed when the tunnel constructor method 1011 is invoked. Implementation 1016 is code which determines the inside port.

RPCTunnel is a subclass of FWTunnel 1010 from which tunnel objects to an RPC Calender service are instantiated. When an tunnel object is created as an instance of the RPCTunnel class, many of the steps shown in FIG. 9, such as establishing the user-host thread and the host-user thread, are performed in the same manner as for any other objects created as an instance of FWTunnel. However, the inside port is determined in different manner. Specifically, the inside port is determined according to the service mapped approach. Override implementation 1026 is code which determines the inside port in accordance with the service mapped approach.

Classes for Providing Additional Functionality

In addition to providing subclasses that configures inside channels in a particular manner, a particular subclass can be provided with overriding implementations or additional methods that provide additional functionality needed for a particular situation. For example, IMAP subclass 1030, shown in FIG. 10, provides an authenticate method 1033, which is invoked by the override implementation 1037 of the tunnel constructor method 1011. The authenticate method 1037 interfaces with the authentication mechanism of IMAP service 315 to authenticate the user to the IMAP service (i.e. relative to the IMAP service). The authenticate method 1037 may provide data to the authentication mechanism of the IMAP service based on the session data associated with the user. Note that internal services may require and provide their own authentication mechanisms even though a user has been authenticated relative to the firewall.

Sockets Configured Through Inheritance

As mentioned before, tunnel sockets configured for a particular situation can be configured using the power and simplicity of inheritance. For example, a superclass of sockets may be established for creating sockets using standard direct TCP connections. A subclass of the superclass provides an override implementation that layers various protocols (e.g. SSL, SOCKS) over TCP, or configures TCP to use specific low level network security features (e.g. IPSEC or Simple Key Management for the Internet Protocol, "SKIP", defined by Sun Microsystems).

A group of related services might use common service mapping infrastructure. For example, all the different sorts of mail services for a given user might be offered at the same host but at different ports. A base class would map from the user to the mail host.

The socket factory may select the particular class from which to create a socket based on tunnel configuration data. For example, the tunnel configuration table may contain another field called encryption protocol, which stores a value indicating the encryption protocol to use for a particular tunnel. At step 620, it may be determined that a particular encryption protocol is to used to configure the socket. At step 630, a socket may be created and configured to use the particular protocol by creating the object as an instantiation of the class or subclass that corresponds to the particular encryption protocol.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of communicating between a process on an external host and an internal host behind a firewall, the method comprising:

authenticating, relative to said firewall, a user that is associated with said process; and if said user is authenticated relative to said firewall, then:
generating tunnel configuration data based on information particular to the user and information particular to the external host, the tunnel configuration data indicating a configuration of a tunnel for connecting said process to said internal host and the manner in which the tunnel is created, establishing a session associated with said user, wherein the tunnel is associated with the session, and causing the tunnel configuration data to be transmitted to said external host.

2. The method of claim 1, further including:
requesting a socket for connecting said process to said internal host; and
generating said socket based on said tunnel configuration data, said socket being configured to connect said process to said internal host through said tunnel.

3. The method of claim 2, wherein generating said socket further includes configuring said socket to connect said process to said firewall via a first channel using said session.

4. The method of claim 3, wherein:
said first channel includes a first port on said firewall; and
the step of configuring said socket includes configuring said socket based on a mapping that maps said first port to a second port on said internal host.

5. The method of claim 2, further including:
requesting a connection through said socket, and
in response to requesting a connection through said socket, establishing said connection through said tunnel.

6. The method of claim 1, wherein the tunnel configuration data indicates a port on the firewall to which to connect for connecting to the internal host.

7. The method of claim 6, wherein the tunnel configuration data indicates an encryption protocol for use with the tunnel.

8. The method of claim 1, wherein the tunnel configuration data indicates a security mechanism for use with the tunnel.

9. The method of claim 1, the tunnel configuration data based on the internal state of the firewall.

10. The method of claim 1, wherein authenticating includes receiving information identifying the user, and wherein the tunnel configuration is generated using information from a database corresponding to the received information.

11. A computer-readable storage medium carrying one or more sequences of one or more instructions for communicating between a process on an external host and an internal host behind a firewall, wherein the execution of the one or more sequences of the one or more instructions by one or more processors causes the one or more processors to perform:
authenticating, relative to said firewall, a user that is associated with said process; and
if said user is authenticated relative to said firewall, then:
generating tunnel configuration data based on information particular to the user and information particular to the external host, the tunnel configuration data indicating a configuration of a tunnel for connecting said process to said internal host and the manner in which the tunnel is created,
establishing a session associated with said user, wherein said tunnel is associated with the session, and
causing the tunnel configuration data to be transmitted to said external host.

12. A computer system, comprising:
a firewall comprising a processor; and
a memory coupled to said processor,
said processor configured to authenticate a user that is associated with a process relative to said firewall and, if said user is authenticated relative to said firewall:
generate tunnel configuration data using user profile data and information associated with the external host, said tunnel configuration data indicating a configuration of a tunnel for connecting said process to an internal host behind said firewall and the manner in which the tunnel is created,
establish a session associated with said user, wherein said tunnel is associated with the session, and
cause the tunnel configuration data to be transmitted to said external host.

* * * * *

UNITED STATES PATENT AND TRADEMARK OFFICE
CERTIFICATE OF CORRECTION

PATENT NO.        : 7,150,040 B2                                    Page 1 of 1
APPLICATION NO. : 10/846688
DATED             : December 12, 2006
INVENTOR(S)       : David Brownwell It is certified that error appears in the above-identified patent and that said Letters Patent is hereby corrected as shown below:

On the title page, item (57), line 16, "mariners." should read --maners.--.

Signed and Sealed this

Eleventh Day of November, 2008

JON W. DUDAS
*Director of the United States Patent and Trademark Office*